(12) United States Patent
Suda et al.

(10) Patent No.: US 11,273,763 B2
(45) Date of Patent: Mar. 15, 2022

(54) IMAGE PROCESSING APPARATUS, IMAGE PROCESSING METHOD, AND IMAGE PROCESSING PROGRAM

(71) Applicant: ALPINE ELECTRONICS, INC., Tokyo (JP)

(72) Inventors: Ryohei Suda, Iwaki (JP); Keisuke Honda, Iwaki (JP); Chie Matsuzaki, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 50 days.

(21) Appl. No.: 16/924,959

(22) Filed: Jul. 9, 2020

(65) Prior Publication Data
US 2021/0039554 A1 Feb. 11, 2021

(30) Foreign Application Priority Data

Aug. 6, 2019 (JP) .............................. JP2019-144115

(51) Int. Cl.
*B60R 1/00* (2022.01)
*G06T 7/593* (2017.01)
(Continued)

(52) U.S. Cl.
CPC ................ *B60R 1/00* (2013.01); *G06T 7/593* (2017.01); *H04N 5/2253* (2013.01);
(Continued)

(58) Field of Classification Search
CPC ...... H04N 5/247; H04N 5/265; H04N 5/2253; H04N 5/2624; H04N 5/2628;
(Continued)

(56) References Cited

U.S. PATENT DOCUMENTS

| 2002/0063711 A1 | 5/2002 | Park et al. |
| 2007/0092245 A1 | 4/2007 | Bazakos et al. |
| 2009/0079553 A1* | 3/2009 | Yanagi ...................... B60R 1/00 340/435 |

(Continued)

FOREIGN PATENT DOCUMENTS

| JP | 2015-74436 | 4/2015 |
| JP | 2016-175586 | 10/2016 |
| JP | 2018195289 A | * 12/2018 |

OTHER PUBLICATIONS

Extended European Search Report for 20189190.0 dated Dec. 14, 2020, 11 pgs.

(Continued)

*Primary Examiner* — Peet Dhillon
(74) *Attorney, Agent, or Firm* — Crowell & Moring LLP (57) ABSTRACT

An image processing apparatus includes side cameras attached to a side portion of a vehicle and configured to provide an image obtained by capturing the rear of the side portion including a vehicle body region; a fisheye camera attached to a rear portion of the vehicle and configured to provide an image including the rear of the vehicle captured at a wide angle of view; a narrow-angle camera attached to the rear portion of the vehicle and configured to provide an image including the rear of the vehicle captured at a narrow angle of view; and a synthesizing unit configured to synthesize the image of the fisheye camera and the image of the narrow-angle camera corresponding to the vehicle body region of the image of the side camera in the vehicle body region.

17 Claims, 8 Drawing Sheets

(51) Int. Cl.
*H04N 5/225* (2006.01)
*H04N 5/247* (2006.01)
*H04N 5/262* (2006.01)
*H04N 5/265* (2006.01)

(52) U.S. Cl.
CPC ............. *H04N 5/247* (2013.01); *H04N 5/265* (2013.01); *H04N 5/2628* (2013.01); *B60R 2300/105* (2013.01); *B60R 2300/20* (2013.01); *B60R 2300/30* (2013.01); *B60R 2300/802* (2013.01)

(58) Field of Classification Search
CPC ............. B60R 2300/20; B60R 2300/30; B60R 2300/105; B60R 2300/303; B60R 2300/802
See application file for complete search history.

(56) References Cited

U.S. PATENT DOCUMENTS

| 2010/0013927 | A1 | 1/2010 | Nixon | |
| 2014/0114534 | A1* | 4/2014 | Zhang | H04N 5/23238 |
| | | | | 701/42 |
| 2015/0103172 | A1* | 4/2015 | Shimizu | G06T 3/4038 |
| | | | | 348/148 |

OTHER PUBLICATIONS

Janice Pan et al.: "Rear-Stitched View Panorama: A Low-Power Embedded Implementation for Smart Rear-View Mirrors on Vehicles", 2017 IEEE Conference on Computer Vision and Pattern Recognition Workshops (CVPRW), Jul. 21, 2017 (Jul. 21, 2017), pp. 20-29.

* cited by examiner

SEE-THROUGH VIEW
BY FISHEYE CAMERA

FIG. 4B

SEE-THROUGH VIEW
BY NARROW-ANGLE CAMERA

IMAGE PROCESSING APPARATUS, IMAGE PROCESSING METHOD, AND IMAGE PROCESSING PROGRAM

RELATED APPLICATION

The present application claims priority to Japanese Patent Application Number 2019-144115, filed Aug. 6, 2019, the entirety of which is hereby incorporated by reference.

BACKGROUND

1. Field of the Invention

The present invention relates to an image processing apparatus that processes an image captured by a vehicle-mounted camera, and more particularly, to a method of synthesizing an image captured by a rear camera with an image captured by a side camera.

2. Description of the Related Art

In order to support a driver's driving or improve visibility, a camera monitor system (CMS) that displays an image captured by a vehicle-mounted camera on a display is mounted in a vehicle. For example, a side camera is attached to a side portion of the vehicle as a substitution unit for a side mirror, and an image of the rear of the side portion of the vehicle captured by the side camera is displayed on the display. The image captured by the side camera includes a portion of a vehicle body of the user's own vehicle, like an image of the optical side mirror, but there is known a method of synthesizing an area of a blind spot caused by the vehicle body with an image of a rear camera to make the vehicle body look transparent (hereafter, referred to as see-through view).

Figure 1:
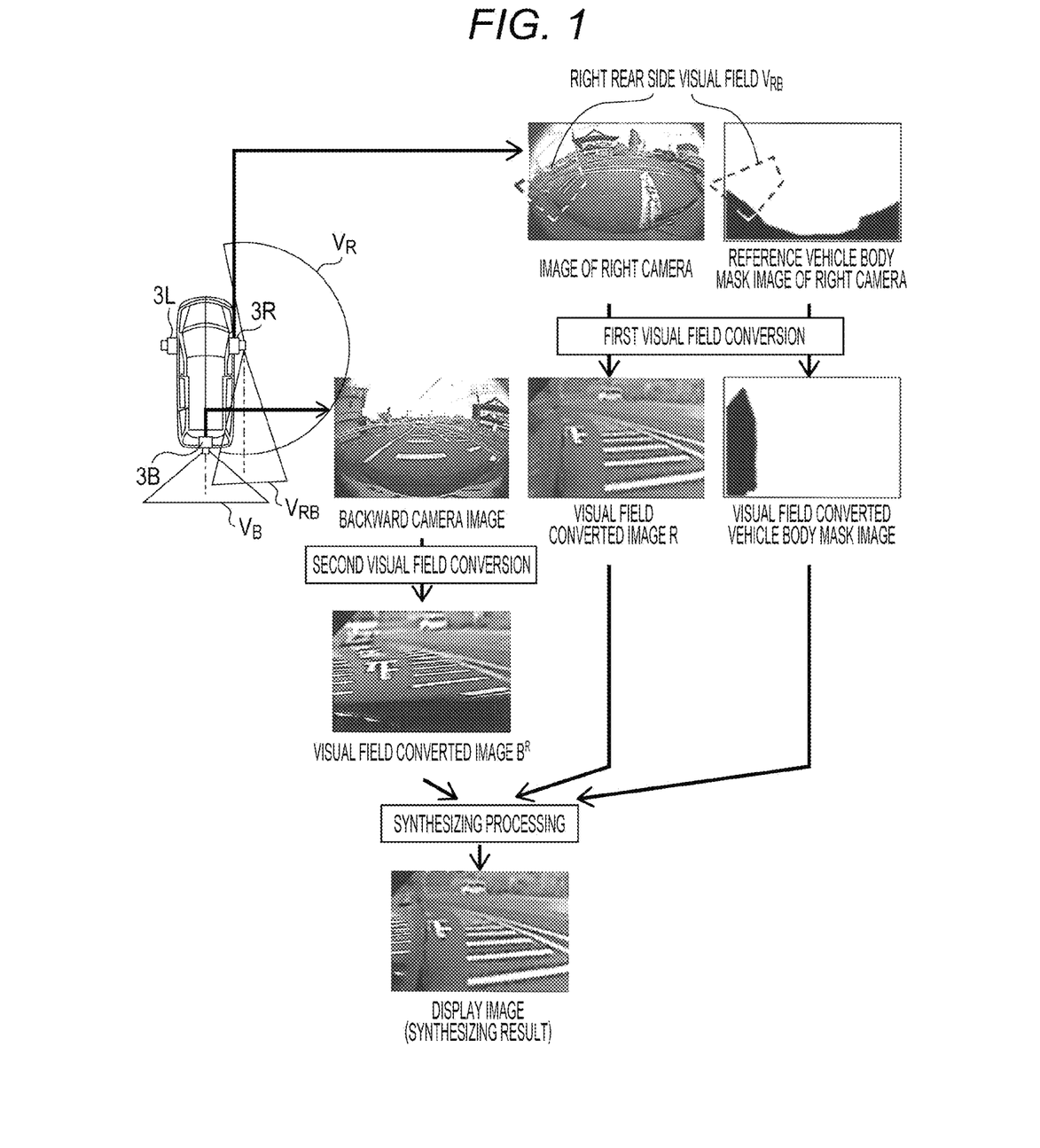
FIG. 1 is a view illustrating an example of synthesizing an image captured by a rear camera with an image captured by a conventional side camera.

In JP 2015-74436 A, as illustrated in FIG. 1, when synthesizing the image of the side camera and the image of the rear camera, a right camera image captured by a right camera 3R and a reference vehicle body mask image of the right camera 3R are subjected to first visual field conversion processing to generate a visual field converted image R and a visual field converted vehicle body mask image, a backward camera image captured by a backward camera 3B is subjected to second visual field conversion processing to generate a visual field converted image BR, and the visual field converted image R and the visual field converted image BR are synthesized based on pixel values of the visual field converted vehicle body mask image. In this way, the backward camera image captured by the backward camera 3B is synthesized with a vehicle body region of the visual field converted image R to generate a see-through view that complements a blind spot caused by the vehicle body. It should be noted that in JP 2015-74436 A, a position of a projection surface behind the vehicle body is calculated using a distance sensor such as an ultrasonic wave or a laser, and the image is synthesized on the projection surface.

Figure 2:
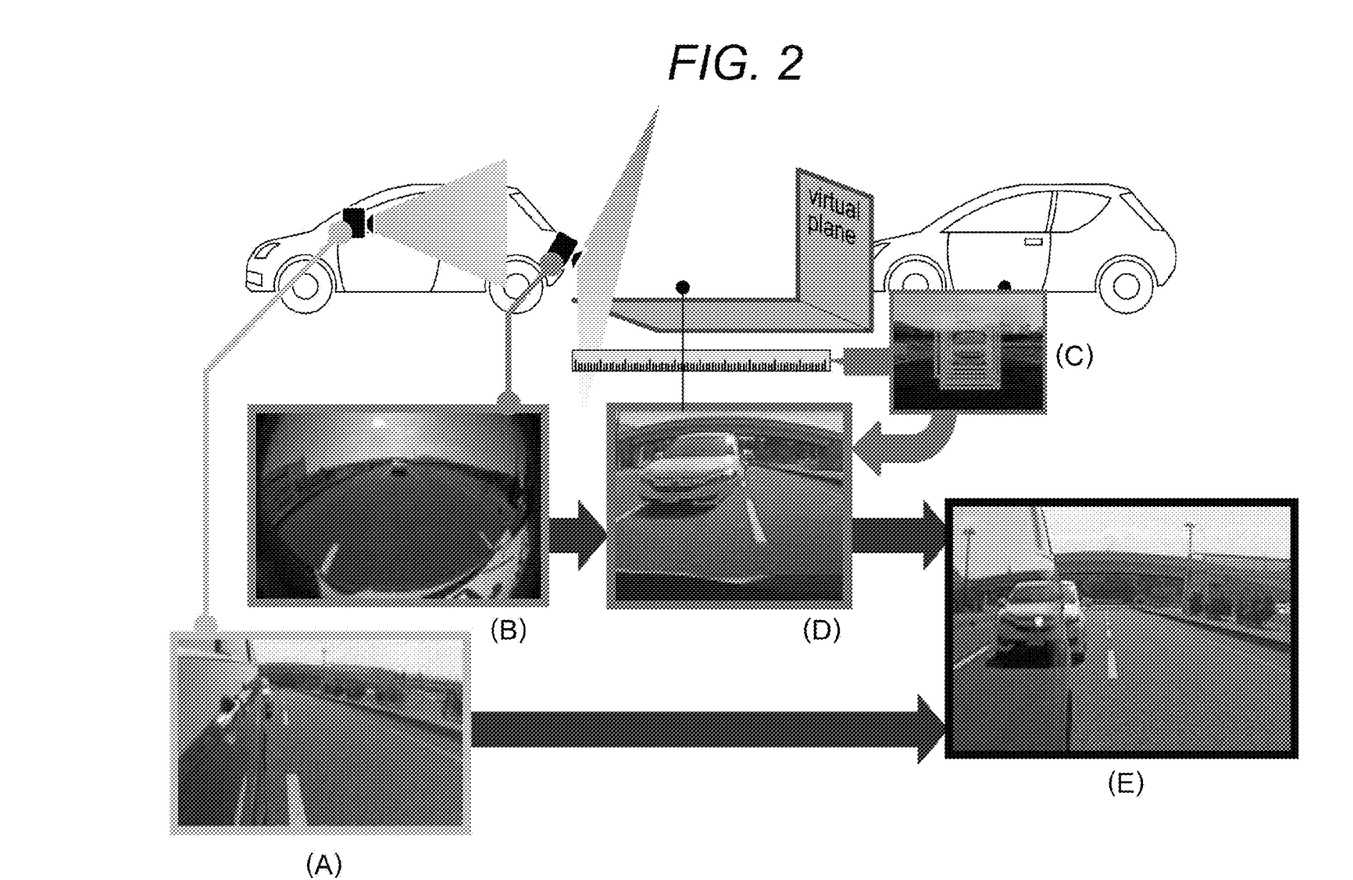
FIG. 2 is a view illustrating a method of generating a conventional see-through view.

FIG. 2 illustrates a schematic process of a method of generating a conventional see-through view. FIG. 2(A) illustrates that an image of the rear of a side portion of a vehicle is captured by a side camera, FIG. 2(B) illustrates that an image of the rear of the vehicle is captured by a rear camera of a fisheye lens, FIG. 2(C) illustrates that a trailing vehicle is detected by recognition processing of the image captured by the rear camera, and a distance to the trailing vehicle is calculated, FIG. 2(D) illustrates that a virtual plane (projection plane) is set according to the calculated distance, and the image captured by the rear camera is projected on the virtual plane, and FIG. 2(E) illustrates synthesizing of the image of the side camera and the projection image.

The rear camera is usually attached to a rear portion of the vehicle, and the backward image captured by the rear camera is used for parking assistance, obstacle detection, and the like when the vehicle moves backward. For this reason, the rear camera uses a fisheye lens with a large angle of view to be able to capture a road surface near a rear end of the own vehicle (e.g., the angle of view is 180 degrees or more). On the other hand, the side camera is attached to a side portion of the vehicle near a door mirror, and the angle of view thereof is smaller than the angle of view of the rear camera (e.g., 90 degrees or less) so that it is possible to capture up to a distant area of the rear of the side portion of the vehicle.

Figure 3:
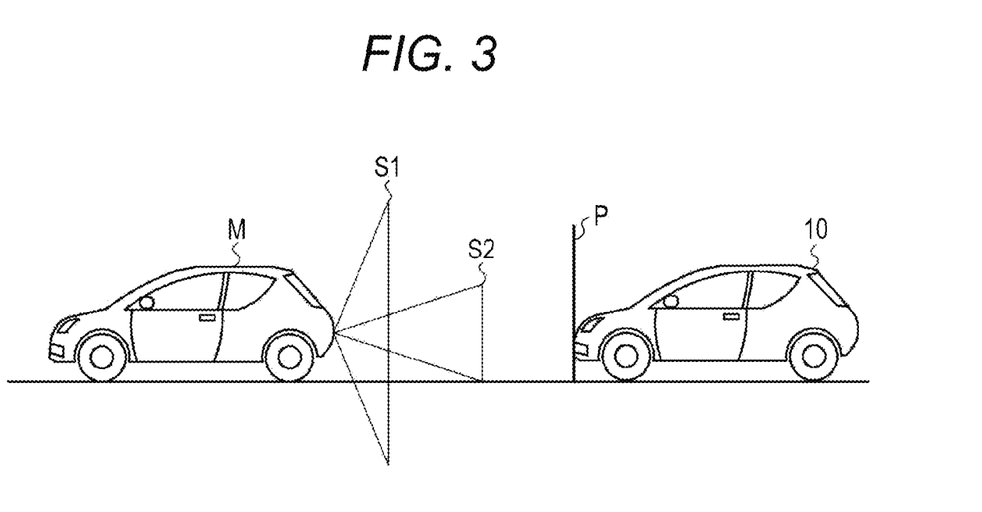
FIG. 3 is a schematic view of a visual field range when a fisheye camera and a narrow-angle camera are used for a rear camera.

FIG. 3 schematically illustrates an imaging range when a fisheye camera having a large viewing angle S1 is used for the rear camera and an imaging range when a narrow-angle camera having a narrow viewing angle S2 is used for the rear camera. P is a projection plane set to generate a see-through view, and the image captured by the side camera and the image captured by the rear camera are coordinate-transformed so as to be projected on the projection plane P. The projection plane P dynamically changes depending on a position of a trailing vehicle 10, and when the trailing vehicle 10 approaches the user's own vehicle M, an image quality of the fisheye camera tends to improve, while a blind spot of the narrow-angle camera tends to increase.

When the fisheye camera is used for the rear camera, since a range of the visual field is wide, it is possible to capture the road surface immediately below the rear end of the vehicle in the vicinity of the rear end of the vehicle. In other words, even if the trailing vehicle 10 approaches the vehicle M, the trailing vehicle 10 can be evenly captured and there are few blind spots (ranges that cannot be captured). However, since the image quality is low and an aberration is large due to a wide visual field range, the image becomes unclear and distortion increases as the distance to the trailing vehicle 10 increases. On the other hand, in the case where the narrow-angle camera is used for the rear camera, since the image quality is high and the aberration is small due to a narrow visual field range, the image is clear even if the distance to the trailing vehicle 10 is large. However, when the trailing vehicle 10 approaches the vehicle M, the blind spot that cannot be captured by the narrow-angle camera becomes large. As described above, the fisheye camera and the narrow-angle camera have advantages and disadvantages.

Figure 4A:
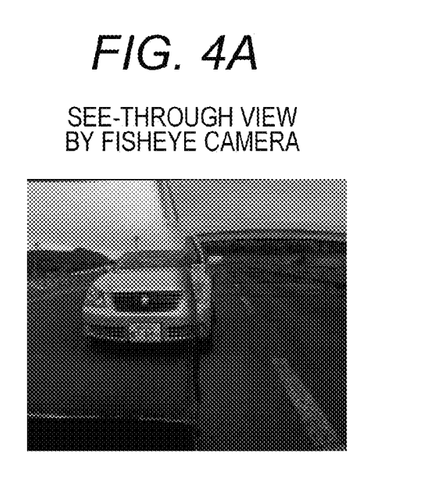
FIG. 4A is a display example of a see-through view when the fisheye camera is used.
Figure 4B:
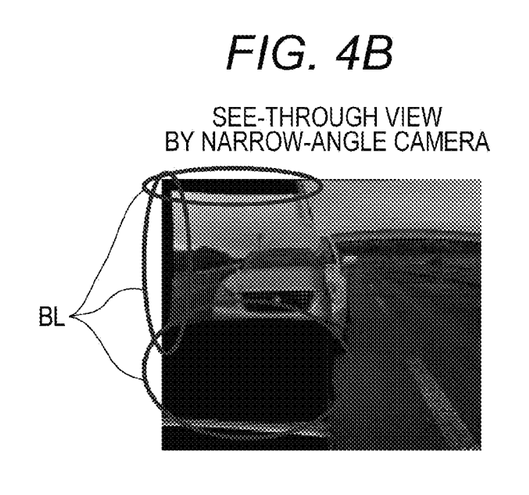
FIG. 4B is a display example of the see-through view when the narrow-angle camera is used.

FIG. 4A is a display example when a see-through view is generated using the fisheye camera for the rear camera. In this case, an image quality of a see-through portion in the vehicle body region of the image of the side camera, that is, the portion synthesized with the image of the fisheye camera, deteriorates. FIG. 4B is a display example when a see-through view is generated using the narrow-angle camera for the rear camera. In this case, the image quality of the see-through portion is good, but when the trailing vehicle 10 approaches, blind spot regions BL occur. FIG. 4B illustrates three blind spot regions BL on an upper side, a side portion, and a lower side of the trailing vehicle. As described above, in the generation of the conventional see-through view, there is a problem that a clear image cannot be obtained when the image captured by the fisheye camera or the narrow-angle camera is synthesized with the image captured by the side camera.

SUMMARY

An object of the present disclosure is to provide an image processing apparatus, an image processing method, and an image processing program capable of solving such a conventional problem and sharpening synthesis of images captured by a plurality of imaging units.

An image processing apparatus according to the present disclosure includes a first imaging unit attached to a side portion of a vehicle and configured to provide a first image obtained by capturing the rear of the side portion including a vehicle body region; a second imaging unit attached to a rear portion of the vehicle and configured to provide a second image including the rear of the vehicle captured at a first angle of view; a third imaging unit attached to the rear portion of the vehicle and configured to provide a third image including the rear of the vehicle captured at a second angle of view narrower than the first angle of view; and a synthesizing unit configured to synthesize the second image and the third image corresponding to the vehicle body region of the first image in the vehicle body region.

In one embodiment, the synthesizing unit may complement a blind spot region of the third image by the second image. In one embodiment, when the blind spot region of the third image satisfies a predetermined condition, the synthesizing unit may complement the blind spot region by the second image. In one embodiment, when the blind spot region of the third image does not satisfy the predetermined condition, the synthesizing unit may synthesize only the second image in the vehicle body region of the first image without complementing the blind spot region by the second image. In one embodiment, the predetermined condition may define a position where the blind spot region occurs, the number of blind spot regions that occur, a size of the blind spot region that occurs, or a distance to an object behind the vehicle. In one embodiment, when the blind spot region of the third image occurs only at a lower side of the trailing object, the synthesizing unit may complement the blind spot region by the second image. In one embodiment, when the blind spot region of the third image occurs at a position other than the lower side of the trailing object, the synthesizing unit may synthesize only the second image in the vehicle body region of the first image without complementing the blind spot region by the second image. In one embodiment, the synthesizing unit may complement the blind spot region by the second image in response to a dynamic change in the blind spot region of the third image, or synthesize only the second image in the vehicle body region of the first image without complementing the blind spot region by the second image. In one embodiment, when transition is made from synthesis using the second image and the third image to synthesis using the second image, the synthesizing unit may control the synthesis of images so that transmittance of the second image gradually increases in an overlapping region of the second image and the third image. In one embodiment, the image processing apparatus may further include a calculating unit configured to calculate a distance to the trailing object, in which the synthesizing unit sets a projection plane based on the calculated distance, converts coordinates of the first image, the second image, and the third image on the set projection plane, and synthesizes the converted second and third images in a vehicle body region of the converted first image. In one embodiment, the calculating unit may calculate the distance to the trailing object from a parallax when the second image and the third image are stereoscopically viewed. In one embodiment, the calculating unit may calculate the distance to the trailing object by a distance sensor such as radar or LiDAR. In one embodiment, the second image may be usable as an image for a rear view when the vehicle moves backward, and the third image may be usable as an image for an interior mirror. In one embodiment, the image processing apparatus may further include a display unit configured to display the image synthesized by the synthesizing unit. In one embodiment, the second imaging unit may include a fisheye lens having a wide-angle imaging range, and the third imaging unit may include a narrow-angle lens having a relatively narrower imaging range than the fisheye lens.

An image processing method according to the present disclosure in an image processing apparatus including a first imaging unit attached to a side portion of a vehicle and configured to provide a first image obtained by capturing the rear of the side portion including a vehicle body region, a second imaging unit attached to a rear portion of the vehicle and configured to provide a second image including the rear of the vehicle captured at a first angle of view, and a third imaging unit attached to the rear portion of the vehicle and configured to provide a third image including the rear of the vehicle captured at a second angle of view narrower than the first angle of view, includes a step of synthesizing the second image and the third image corresponding to the vehicle body region in the vehicle body region of the first image.

In one embodiment, in the synthesizing step, when a blind spot region of the third image satisfies a predetermined condition, the blind spot region may be complemented by the second image. In one embodiment, in the synthesizing step, when the blind spot region of the third image does not satisfy the predetermined condition, only the second image may be synthesized in the vehicle body region of the first image without complementing the blind spot region by the second image.

An image processing program according to the present disclosure executed by an image processing apparatus including a first imaging unit attached to a side portion of a vehicle and configured to provide a first image obtained by capturing the rear of the side portion including a vehicle body region, a second imaging unit attached to a rear portion of the vehicle and configured to provide a second image including the rear of the vehicle captured at a first angle of view, and a third imaging unit attached to the rear portion of the vehicle and configured to provide a third image including the rear of the vehicle captured at a second angle of view narrower than the first angle of view, includes a step of synthesizing the second image and the third image corresponding to the vehicle body region in the vehicle body region of the first image.

In one embodiment, in the synthesizing step, when a blind spot region of the third image satisfies a predetermined condition, the blind spot region may be complemented by the second image. In one embodiment, in the synthesizing step, when the blind spot region of the third image does not satisfy the predetermined condition, only the second image may be synthesized in the vehicle body region of the first image without complementing the blind spot region by the second image.

According to the present disclosure, by enabling the second image captured at the first angle of view and the third image captured at the second angle of view narrower than the first angle of view to be synthesized in the vehicle body region of the first image, the respective advantages (that is, the image captured at the first angle of view has a wide imaging range and is less likely to cause the blind spots, and the image captured at the second angle of view has the higher image quality) of the image captured at the first angle of view and the image captured at the second angle of view are utilized in the synthesized image, thereby making it possible to obtain a clear synthesized image.

DETAILED DESCRIPTION OF THE PREFERRED EMBODIMENTS

An image processing apparatus according to the present disclosure has a function of synthesizing images captured by an imaging camera attached to a moving body or the like. The synthesized image is used for a camera monitor system (CMS) and is displayed on a display. In one preferable aspect, the image processing apparatus synthesizes an image captured by a rear camera with a region that is a blind spot of a vehicle body included in an image captured by a side camera to generate a see-through view.

Embodiment

Figure 5:
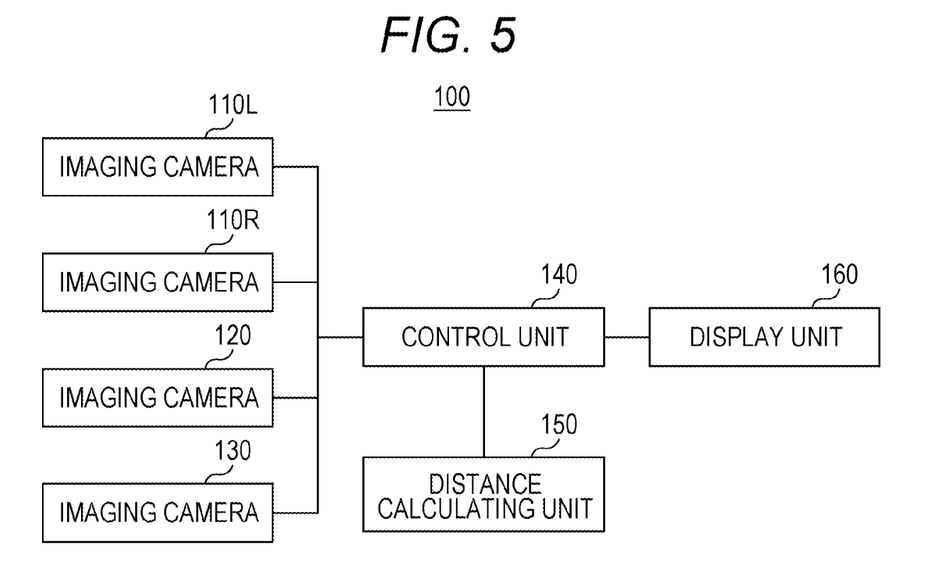
FIG. 5 is a block diagram illustrating a configuration of an image processing apparatus according to an embodiment of the present invention.

FIG. 5 is a block diagram illustrating a configuration of an image processing apparatus according to an embodiment of the present invention. An image processing apparatus 100 according to the present embodiment includes a plurality of imaging cameras 110L, 110R, 120, and 130 attached to a vehicle, a control unit 140 that receives images captured by the imaging cameras and performs various controls including image processing or the like, a distance calculating unit 150 that calculates a distance to a trailing object (e.g., a trailing vehicle or the like) of the user's own vehicle, and a display unit 160 that displays an image processed by the control unit 140. The image processing apparatus according to the present embodiment can also operate in cooperation with a vehicle-mounted device (e.g., an electronic device having an audio/visual/navigation function) mounted in the vehicle.

Figure 6:
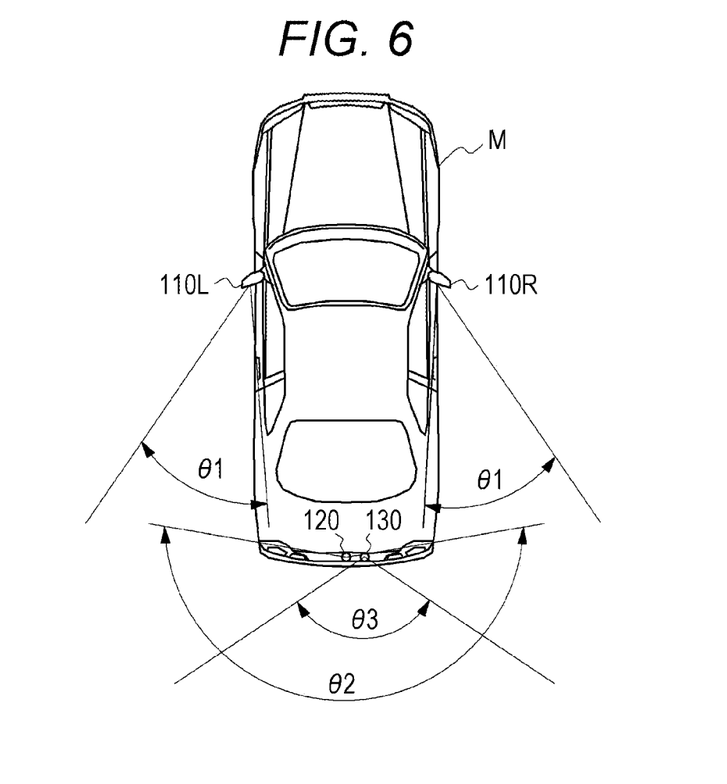
FIG. 6 is a plan view illustrating an installation example of imaging cameras according to an embodiment of the present invention.

FIG. 6 is a plan view of a vehicle illustrating an installation example of the imaging cameras. The imaging cameras 110 to 130 include, for example, an imaging element such as a CCD sensor or a CMOS sensor and an imaging lens. The imaging cameras 110L and 110R are side cameras that substitute side mirrors, and are attached to the inside of left and right side mirrors of a vehicle M or in the vicinity thereof, respectively, or replace the side mirrors (hereinafter referred to as side cameras 110L and 110R). An angle of view θ1 of imaging lenses of the side cameras 110L and 110R, that is, an imaging range is, for example, 90 degrees or less from an optical axis. A side portion of a vehicle body is projected on an image projected on an optical side mirror to easily grasp a positional relationship between the vehicle M and surrounding objects. For this reason, the optical axes of the side cameras 110L and 110R are adjusted so that a portion of the side portion of the vehicle body is captured, at least in the same manner as the optical side mirror.

Two imaging cameras 120 and 130 are attached to a rear portion of the vehicle M. The imaging camera 120 is attached, for example, near a height of a license plate or bumper at substantially the center of the left and right sides of the rear portion of the vehicle M. The imaging camera 120 includes a fisheye lens with a wide viewing angle, and an angle of view θ2 thereof is about 180 degrees or more (hereinafter referred to as a fisheye camera). The fisheye camera 120 captures a wide range of the rear of the vehicle M, and the captured image includes a road surface at a rear end of the vehicle M. The image captured by the fisheye lens 120 is displayed as a rear view on the display unit 160 when the vehicle M moves backward (that is, when a gear position is in reverse). A driver visually checks for an obstacle to the rear and parks while visually checking the rear view. In addition, the image captured by the fisheye camera 120 is also used for synthesizing images captured by the side cameras 110L and 110R, as described later.

The other imaging camera 130 is attached to a position spaced apart from the fisheye camera 120 by a certain distance at substantially the same height as the fisheye camera 120 of the rear portion of the vehicle M. The imaging camera 130 includes an imaging lens with an angle of view smaller than that of the fisheye lens, and an angle of view θ3 thereof is about 90 degrees or less (hereinafter, referred to as a narrow-angle camera). The narrow-angle camera 130 can be used as a substitution for an interior mirror, and in this case, captures the rear of the vehicle M in the same imaging range as an image projected on the interior mirror. The image captured by the narrow-angle camera 130 is displayed as a rear view on the display unit 150 when the vehicle moves forward. In addition, the narrow-angle camera 130 is also used for synthesizing the images captured by the side cameras 110L and 110R, together with the fisheye camera 120.

The control unit 140 receives the images captured by the side cameras 110L and 110R, the fisheye camera 120, and the narrow-angle camera 130, processes the received images, and displays the processed images on the display unit 160. The control unit 140 sets a projection plane P (see FIG. 3) on the basis of the distance to a trailing object calculated by the distance calculating unit 150, and performs coordination conversion of the images to project the images captured by the cameras 110 to 130 having different installation positions or different angles of view on the projection plane P. On the projection plane P, the control unit 140 calculates a correspondence relationship between pixels of each of the converted images of the side cameras 110L and 110R, the fisheye camera 120, and the narrow-angle camera 130. When the see-through view is generated, the control unit 140 identifies or extracts the images of the fisheye camera 120 and the narrow-angle camera 130 corresponding to the image of the vehicle body region in the images of the side cameras 110L and 110R on the projection plane P, and synthesizes the identified or extracted images with the vehicle body region. Further, the control unit 140 calculates which region in the images of the side cameras 110L and 110R on the projection plane P corresponds to the vehicle body region from the installation positions of the side cameras, a direction of the optical axis, an imaging range, a vehicle body shape, and the like.

The control unit 140 includes, for example, a processor for performing image processing, a microcomputer, a ROM/RAM, and the like, and in one preferable example, the control unit 140 executes an image processing program stored in the ROM/RAM to control hardware and perform image processing necessary for generating an image such as the see-through view and the rear view.

The distance calculating unit 150 calculates the distance to the trailing object of the vehicle M. The calculation is performed at a constant period, for example. The object is, for example, a trailing vehicle traveling behind the user's own vehicle, or an obstacle or a road existing behind the user's own vehicle. In a method of calculating the distance, for example, the distance to the object is calculated using a distance sensor such as radar or LiDAR, or the distance to the object is calculated by stereoscopically viewing the two images of the fisheye camera 120 and the narrow-angle camera 130. In the latter case, the distance calculating unit 150 stereoscopically views the two images converted on the projection plane P and calculates the distance to the object from the suggestion. The distance calculating unit 150 provides the calculated distance to the control unit 140 each time the distance is calculated. The control unit 140 sets the projection plane P for generating the see-through view based on the distance received from the distance calculating unit 150. A position of the projection plane P changes each time according to the distance to the object.

The display unit 160 receives image data processed by the control unit 140 and displays the received image data. The display unit 160 includes one or more display media such as a liquid crystal display, an organic EL display, and a projection device (HUD). An installation position of the display unit 160 is not particularly limited, but is, for example, a liquid crystal display module in an instrument panel, a display for a vehicle-mounted device, a projected image on a windshield, or the like. In one preferable example, the display unit 160 displays images of the rear of the side portions of the vehicle captured by the side mirrors 110L and 110R (see-through view display), displays a rear image of the vehicle captured by the fisheye camera 120 (rear view display), or displays a rear image of the vehicle captured by the narrow-angle camera 130 (interior mirror view display).

Figure 7:
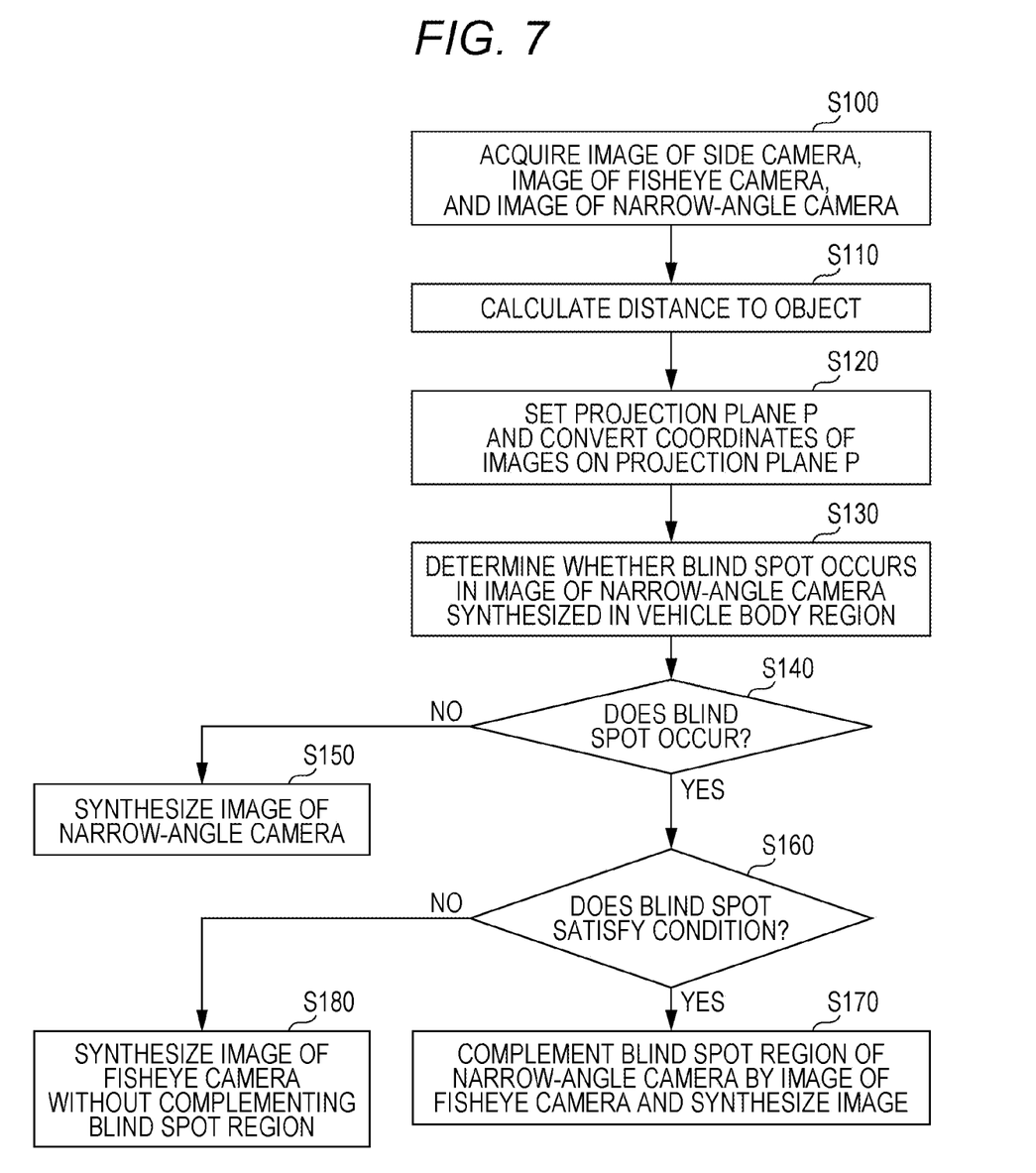
FIG. 7 is a flowchart for describing an operation of generating a see-through view according to an embodiment of the present invention.

Next, the generation of the see-through view according to the present embodiment will be described. FIG. 7 is a flowchart for describing an operation of generating a see-through view according to the present embodiment. Since the see-through view is generated commonly for the side cameras 110L and 110R, the side camera 110L will be described here.

The control unit 140 receives the image captured by the side camera 110L, the image captured by the fisheye camera 120, and the image captured by the narrow-angle camera 130 (S100). In addition, the distance calculating unit 150 calculates the distance to the object behind the vehicle (S110), and provides the calculated distance to the control unit 140.

The control unit 140 sets the projection plane P based on the distance upon receiving the distance from the distance calculating unit 150, and converts the coordinates of the images captured by the side camera 110L, the fisheye camera 120 and the narrow-angle camera 130 on the projection plane P (S120).

Next, when the image of the narrow-angle camera 130 is synthesized in the vehicle body region of the image of the side camera 110L, the control unit 140 determines whether or not a blind spot occurs in the image of the narrow-angle camera 130 (S130). When the narrow-angle camera 130 has, for example, an angle of view θ3 (or an imaging range) of about 90 degrees and is attached near a bumper of the vehicle, and the distance from the vehicle to the trailing object is, for example, about 1.4 m, a blind spot may occur in which the entire trailing object cannot be captured. The control unit 140 calculates a coordinate space of the vehicle body region of the side mirror 110L on the projection plane P, determines that the blind spot does not occur if all the pixels corresponding to the coordinate space can be captured by the narrow-angle camera 130, and determines that the blind spot occurs if the pixels cannot be captured (S140).

Next, when the blind spot does not occur in the image of the narrow-angle camera 130 to be synthesized in the vehicle body region, the control unit 140 synthesizes the image of the narrow-angle camera 130 with the vehicle body region of the image of the side mirror 110L (S150). Since the vehicle body region is synthesized with a high-quality image of the narrow-angle camera 130, the see-through view can be more clearly displayed.

On the other hand, when the blind spot occurs in the image of the narrow-angle camera 130 to be synthesized, the control unit 140 determines whether or not the blind spot satisfies a predetermined condition (S160). The predetermined condition is a condition for determining whether or not a blind spot region of the image of the narrow-angle camera 130 is complemented by the image of the fisheye camera 120. For example, in a case in which the position, size, and number of blind spot regions are such that the blind spot regions are relatively unnoticeable, even if the blind spot region is complemented by the image of the fisheye camera 120 of a low image quality, sharpness of the image is not significantly affected. On the other hand, when the blind spot region overlaps a portion of the trailing vehicle, is relatively large in size, or occurs in large numbers, if the blind spot region is complemented by the image of the fisheye camera 120, the image becomes rather unclear. In this case, the synthesized image can be made clearer by synthesizing only the image of the fisheye camera 120 without using the image of the narrow-angle camera 130, rather than complementing the blind spot region by the image of the fisheye camera 120.

The predetermined condition may define the position, the size, and the number of the blind spot regions as described above, or since the occurrence of the blind spot region is also a function of the distance calculated by the distance calculating unit 150, the distance may be used as a condition. In this case, if the distance from the user's own vehicle to the trailing object is a threshold value or more, it is determined that the condition is met, and if the distance is less than the threshold value, it is determined that the condition is not met.

If the blind spot satisfies the predetermined condition (S160), the control unit 140 complements the blind spot region of the narrow-angle camera 130 by a corresponding image of the fisheye camera 120, and synthesizes the complemented image of the narrow-angle camera 130 and the image of the fisheye camera 120 in the vehicle body region of the image of the side camera 110L (S170). On the projection plane P, since the pixel correspondence relationship between the narrow-angle camera 130 and the fisheye camera 120 is known, the image of the fisheye camera 120 corresponding to the blind spot region is extracted or cut out and synthesized with the blind spot region.

Figure 8:
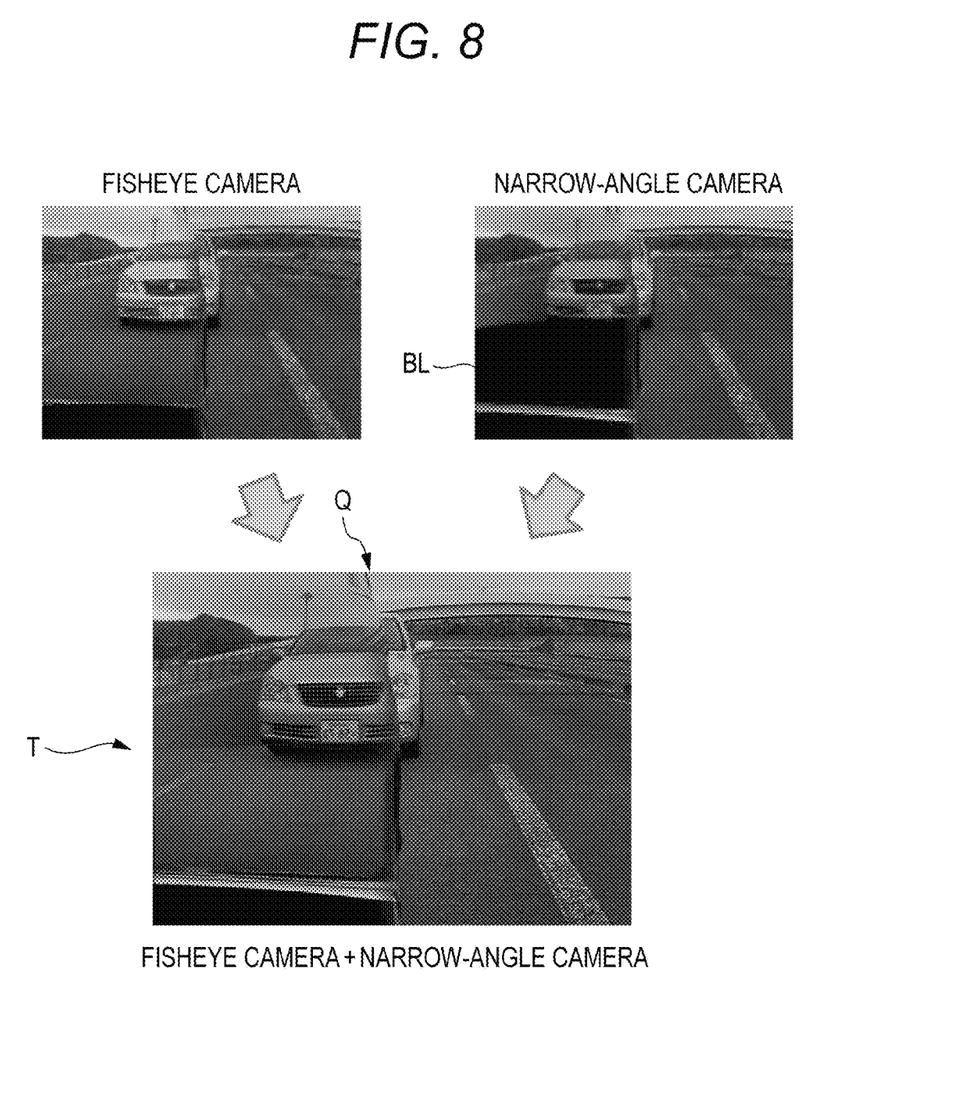
FIG. 8 is a view illustrating an example in which a blind spot region of an image of a narrow-angle camera is complemented with an image of a fisheye camera, and the complemented image is synthesized with an image of a side camera to generate a see-through view according to an embodiment of the present invention.

An example of complementing the blind spot region by the image of the fisheye camera 120 is illustrated in FIG. 8. In this example, a blind spot region BL of the image of the narrow-angle camera occurs in a less noticeable portion below the trailing vehicle. Therefore, the control unit 140 complements the blind spot region BL by determining that the blind spot region satisfies the condition, extracting or cutting out the image corresponding to the blind spot region BL from the fisheye camera 120, and synthesizing the extracted or cut out image in the blind spot region BL. Then, the image in which the blind spot region BL is complemented is synthesized in the vehicle body region of the image of the side camera 110L to generate a see-through view.

"Q" in the see-through view indicates a boundary of the vehicle body region of the side camera, and "T" indicates a boundary between the image of the narrow-angle camera 130 and the image of the fisheye camera 120. Since the boundary T is in the vicinity of the trailing vehicle and the road surface, it is less noticeable. In addition, since the image of the narrow-angle camera 130 is synthesized, the same image quality as that of the side camera 110L can be obtained, and in addition, the blind spot region is complemented by the image of the fisheye camera 120 and a relatively clear high-quality see-through view can be obtained.

Figure 9:
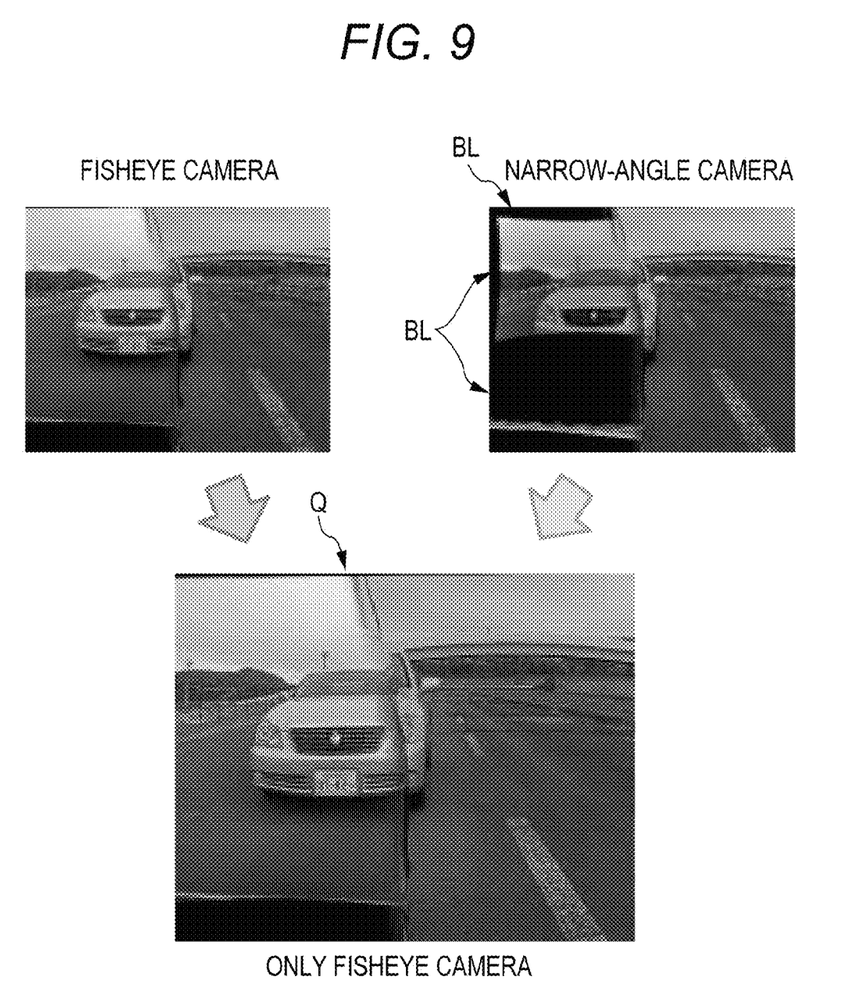
FIG. 9 is a view illustrating an example in which only the image of the fisheye camera is synthesized with the image of the side camera to generate the see-through view according to an embodiment of the present invention.

On the other hand, if the blind spot does not satisfy the predetermined condition (S160), the control unit 140 does not complement the blind spot region of the narrow-angle camera 130 by the image of the fisheye camera 120, and synthesizes only the image of the fisheye camera 120 in the vehicle body region of the image of the side camera 110L (S180). An aspect of such a synthesis is illustrated in FIG. 9. Here, in the image of the narrow-angle camera 130, blind spot regions BL occur at a plurality of positions on a lower side, a side portion, and an upper side of the trailing vehicle. In addition, the blind spot region of the lower side is large enough to overlap a portion of the trailing vehicle. Therefore, the control unit 140 determines that the blind spot region does not satisfy the condition, and synthesizes the image of the fisheye camera 120 with the vehicle body regions of the image of the side camera 110L without complementing the blind spot regions BL by the image of the fisheye camera 120 to generate a see-through view. It should be noted that the image of the fisheye camera is replaced before the blind spot appears in the see-through view. Thus, since the image of the fisheye camera 120 is used, the image quality is somewhat deteriorated, but the display of the blind spot regions can be eliminated in the see-through view in which the trailing vehicle approaches.

The steps illustrated in FIG. 7 are repeatedly executed while the vehicle is traveling (forward or backward) or stopped, and the see-through view is continuously generated. In addition, when the distance to the trailing object calculated by the distance calculating unit 150 changes, the projection plane P changes, the occurrence of the blind spot region dynamically changes accordingly, and the image to be synthesized with the vehicle body region of the image of the side camera is appropriately replaced with the image of the fisheye camera 120 and/or the image of the narrow-angle camera 130.

As described above, according to the present embodiment, by making it possible to synthesize the image of the narrow-angle camera having the substitution function of the interior mirror and the image of the fisheye camera used for the rear view with the image of the side camera, it is possible to generate a clear see-through view by utilizing advantages of the narrow-angle camera and the fisheye camera.

Figure 10:
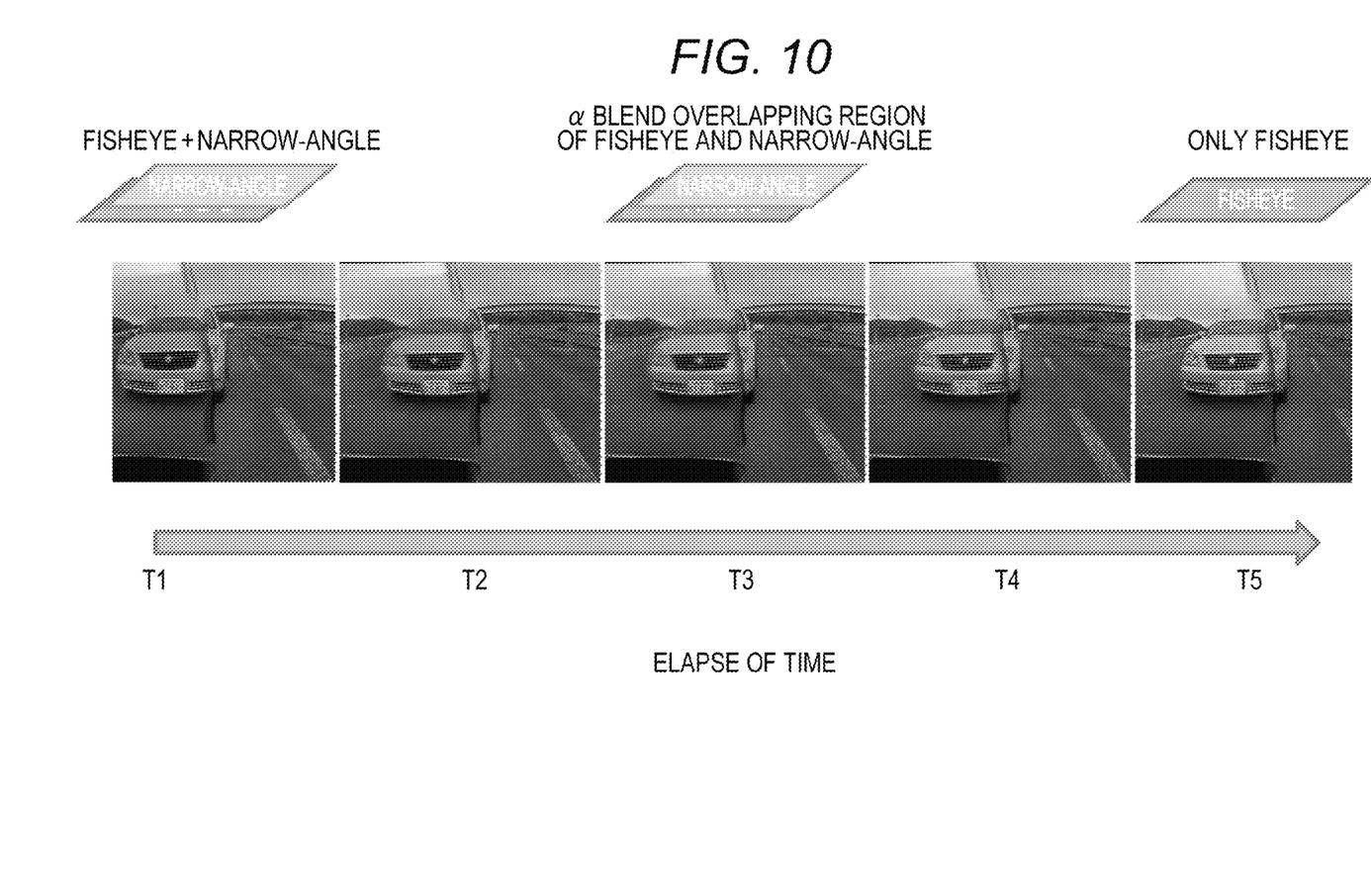
FIG. 10 is a view illustrating a method of synthesizing an image of a narrow-angle camera and an image of a fisheye camera according to a modified example of the present invention.

Next, a modified example of the present invention will be described. As described above, according to the distance calculated by the distance calculation unit 150, that is, depending on the projection plane, the blind spot region occurring in the image of the narrow-angle camera 130 dynamically changes, and as a result, the image used for synthesis transitions from the image of the narrow-angle camera 130 and the fisheye camera 120 to the image of only the fisheye camera 120. To make the replacement of the image smooth during such transition, in a modified example, in an overlapping range of the fisheye camera 120 and the narrow-angle camera 130, the synthesis of both images is controlled so that transmittance of the image of the fisheye camera 120 is gradually increased or transmittance of the image of the narrow-angle camera 130 is gradually decreased for the determination.

An aspect of such image synthesis is illustrated in FIG. 10. It is assumed that at time T1, the blind spot region of the narrow-angle camera 130 is complemented by the image of the fisheye camera 120, and at time T5, the blind spot region is substituted with the image of the fisheye camera 120. The control unit 140 synthesizes the image of the narrow-angle camera and the image of the fisheye camera that are transmitted at a ratio of 7:3, for example, at time T2, synthesizes the image of the narrow-angle camera and the image of the fisheye camera that are transmitted at a ratio of 5:5 at time T3, and synthesizes the image of the narrow-angle camera and the image of the fisheye camera that are transmitted at a ratio of 3:7 at time T4. By performing such synthesis, it is possible to prevent the image quality from changing rapidly.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An image processing apparatus comprising:
    a first imaging unit attached to a side portion of a vehicle and configured to provide a first image obtained by capturing a rear of the side portion including a vehicle body region;

a second imaging unit attached to a rear portion of the vehicle and configured to provide a second image including a rear of the vehicle captured at a first angle of view;

a third imaging unit attached to the rear portion of the vehicle and configured to provide a third image including the rear of the vehicle captured at a second angle of view narrower than the first angle of view; and a synthesizing unit configured to synthesize the second image and the third image corresponding to the vehicle body region of the first image in the vehicle body region;

wherein when a blind spot region of the third image satisfies a predetermined condition, the synthesizing unit complements the blind spot region by the second image, and when the blind spot region of the third image does not satisfy the predetermined condition, the synthesizing unit synthesizes only the second image in the vehicle body region of the first image without complementing the blind spot region by the second image.

2. The image processing apparatus according to claim 1, wherein the predetermined condition defines a position where the blind spot region occurs.

3. The image processing apparatus according to claim 1, wherein the predetermined condition defines a number of blind spot regions that occur.

4. The image processing apparatus according to claim 1, wherein the predetermined condition defines a size of the blind spot region that occurs.

5. The image processing apparatus according to claim 1, wherein the predetermined condition defines a distance to an object behind the vehicle.

6. The image processing apparatus according to claim 1, wherein when a blind spot region of the third image occurs only at a lower side of a backward object, the synthesizing unit complements the blind spot region by the second image.

7. The image processing apparatus according to claim 1, wherein when a blind spot region of the third image occurs at a position other than a lower side of a backward object, the synthesizing unit synthesizes only the second image in the vehicle body region of the first image without complementing the blind spot region by the second image.

8. The image processing apparatus according to claim 1, wherein the synthesizing unit complements a blind spot region by the second image in response to a dynamic change in the blind spot region of the third image, or synthesizes only the second image in the vehicle body region of the first image without complementing the blind spot region by the second image.

9. The image processing apparatus according to claim 8, wherein when transition is made from synthesis using the second image and the third image to synthesis using the second image, the synthesizing unit controls the synthesis of images so that transmittance of the second image gradually increases in an overlapping region of the second image and the third image.

10. The image processing apparatus according to claim 1, further comprising a calculating unit configured to calculate a distance to a trailing object, wherein the synthesizing unit sets a projection plane based on the calculated distance, converts coordinates of the first image, the second image, and the third image on the set projection plane, and synthesizes the converted second and third images in a vehicle body region of the converted first image.

11. The image processing apparatus according to claim 10, wherein the calculating unit calculates the distance to the trailing object from a parallax when the second image and the third image are stereoscopically viewed.

12. The image processing apparatus according to claim 10, wherein the calculating unit calculates the distance to the trailing object by a distance sensor such as radar or LiDAR.

13. The image processing apparatus according to claim 1, wherein the second image is usable as an image for a rear view when the vehicle moves backward, and the third image is usable as an image for an interior mirror.

14. The image processing apparatus according to claim 1, further comprising a display unit configured to display the image synthesized by the synthesizing unit.

15. The image processing apparatus according to claim 1, wherein the second imaging unit includes a fisheye lens having a wide-angle imaging range, and the third imaging unit includes a narrow-angle lens having an imaging range narrower than the fisheye lens.

16. An image processing method in an image processing apparatus including a first imaging unit attached to a side portion of a vehicle and configured to provide a first image obtained by capturing a rear of the side portion including a vehicle body region, a second imaging unit attached to a rear portion of the vehicle and configured to provide a second image including a rear of the vehicle captured at a first angle of view, and a third imaging unit attached to the rear portion of the vehicle and configured to provide a third image including the rear of the vehicle captured at a second angle of view narrower than the first angle of view, the image processing method comprising:

a step of synthesizing the second image and the third image corresponding to the vehicle body region of the first image in the vehicle body region;

wherein when a blind spot region of the third image satisfies a predetermined condition, the synthesizing step complements the blind spot region by the second image, and when the blind spot region of the third image does not satisfy the predetermined condition, the synthesizing step synthesizes only the second image in the vehicle body region of the first image without complementing the blind spot region by the second image.

17. An image processing program executed by an image processing apparatus including a first imaging unit attached to a side portion of a vehicle and configured to provide a first image obtained by capturing a rear of the side portion including a vehicle body region, a second imaging unit attached to a rear portion of the vehicle and configured to provide a second image including a rear of the vehicle captured at a first angle of view, and a third imaging unit attached to the rear portion of the vehicle and configured to provide a third image including the rear of the vehicle captured at a second angle of view narrower than the first angle of view, the image processing program being stored on a non-transitory computer-readable medium and comprising:

a step of calculating a distance to a trailing object; and a step of synthesizing the second image and the third image corresponding to the vehicle body region of the first image in the vehicle body region;

wherein the synthesizing step sets a projection plane based on the calculated distance, converts coordinates of the first image, the second image, and the third image on the set projection plane, and synthesizes the converted second and third images in a vehicle body region of the converted first image.

\* \* \* \* \*